United States Patent [19]

Spek et al.

[11] Patent Number: 4,833,173
[45] Date of Patent: May 23, 1989

[54] COAGULATED MATERIALS

[76] Inventors: Dirk P. Spek, Hoog Meeuwen 19, 4268 GT Meeuwen; Leonardus A. van Der Heyden, Theems 79, 5152 SN Drunen, both of Netherlands

[21] Appl. No.: 224,208

[22] Filed: Jul. 22, 1988

Related U.S. Application Data

[63] Continuation of Ser. No. 937,294, Dec. 3, 1986, abandoned, which is a continuation-in-part of Ser. No. 740,214, Jun. 3, 1985, abandoned.

[51] Int. Cl.$^4$ ............................ C08J 9/28; B05D 5/00
[52] U.S. Cl. ........................................ 521/72; 427/244; 427/246; 427/389.9; 521/82; 521/98; 521/69
[58] Field of Search ...................... 521/72, 69, 82, 98; 427/244, 246, 389.9, 385.5

[56] References Cited

U.S. PATENT DOCUMENTS

| | | | |
|---|---|---|---|
| 3,437,509 | 4/1969 | Coisne | 427/389.9 |
| 4,171,390 | 10/1979 | Hilterhaus et al. | 427/246 X |
| 4,366,192 | 12/1982 | McCartney | 427/246 |

FOREIGN PATENT DOCUMENTS

| | | | |
|---|---|---|---|
| 851330 | 11/1985 | Greece . | |
| 52-013557 | 2/1977 | Japan | 521/72 |

Primary Examiner—Thurman K. Page
Attorney, Agent, or Firm—Panitch Schwarze Jacobs and Nadel

[57] ABSTRACT

The invention relates to a coagulable composition, to a process for the preparation of a coagulated material by impregnating a textile cloth in an impregnating bath containing the coagulable composition followed by coagulation in a coagulating bath and to the resulting coagulated material.

The process of the invention is characterized in that the coagulation is carried out from the water phase, and the impregnating bath contains a chemical or physical foaming agent, wherein foaming occurs simultaneously with the coagulation or immediately thereafter.

It is surprisingly found that according to the present invention a high quality coagulated material is obtained, having properties comparable with the coagulated material obtained according to conventional solvent based processes.

27 Claims, No Drawings

COAGULATED MATERIALS

This application is a continuation of copending application Ser. No. 937,294, filed Dec. 3, 1986 now abandoned and is related to copending application Ser. No. 147,060, filed Jan. 21, 1988, for "Process for the Preparation of a Coagulated Material," which in turn was a continuation-in-part of abandoned application Ser. No. 740,214, filed June 3, 1985.

This invention relates to a coagulable composition; to a process for the preparation of a coagulated material by impregnating a textile cloth in an impregnating bath containing the coagulable composition followed by coagulation in a coagulating bath; and to the resulting coagulated material.

According to the current procedure, a textile cloth is impregnated with a polyurethane by immersing it in a solution of the polyurethane in dimethyl formamide (DMF). Then the polyurethane polymer on the cloth is coagulated by placing the obtained impregnated cloth in a water bath. The apolar polyurethane polymer flocks out in this very polar medium, whereas the DMF is taken up in the water.

It should be noted that according to this known method the textile cloth is impregnated in an organic medium. As organic solvent only DMF is used. Because during coagulation the solvent is taken up in the water, both for economical and environmental-hygienic reasons it is required to separate the solvent from the water. Usually, this separation occurs by distillation of the water/DMF mixture. It is clear that this separation is complicated and expensive, reasons why a coagulation process is needed wherein no organic solvent is used.

It should be clear that in such a process one should start from a polymer which is dissolved in water or dispersed in water, whereupon anyhow the polymer should be coagulated again from the water phase.

It is known that by the use of a heat-coagulable polymer, latices may be coagulated at temperatures above the cloud point of the heat-coagulant.

Furthermore it is known that polymer latices may be coagulated by means of the addition of electrolytes and/or by adapting the pH.

By the use of the known processes up to now, one was not able to achieve the desired coagulation structure. It is believed that such a desired coagulation structure is obtained because the polyurethane polymer is deposited on the fibers in a discontinuous way resulting in a microcellular structure. Such a microcellular structure gives the coagulated cloth the softness and absorption characteristics, which are characteristic for a coagulated material.

By coagulation from the water phase the desired coagulation structure may be obtained by the use of heat coagulants and/or by adding an electrolyte solution and/or by adapting the pH, which coagulation structure, however, is destroyed during drying, wherein the remaining water is removed while obtaining a continuous film.

The cloth thus obtained is very hard and it has characteristics which are different from those of a conventional coagulated material.

This "film forming" is due to the highly polar character of the polyurethane polymer or another polymer dispersed in water together with the highly polar coagulant and/or electrolyte.

The remaining water is strongly bound in this system and it acts as a softener and decreases therefore the film forming temperature essentially.

The present invention aims now to provide a composition and process, wherein the above-mentioned disadvantages are removed effectively.

The coagulable compositions of the present invention contain a coagulable polymer latex and a foaming agent. Cogulation of the latex may be accomplished in one of several ways (heat, addition of electrolyte or pH adjustment) depending upon the particular latex employed.

According to the invention, in a first embodiment there is used a polymer latex, which is coagulable by means of a heat-coagulant, such as for instance polymer latices of the type: polybutadiene latex, polybutadiene styrene copolymer latex, polybutadiene acrylonitrile copolymer latex, polystyrene butadiene acrylonitrile terpolymer latex, polychloroprene latex, polyacrylate latex, polyvinyl acetate latex, polyurethane latex nitrile rubbers, urethane acrylic copolymers, urethane acrylic blends or mixtures thereof.

Because of the specific polymer characteristics of the polyurethane polymer preferably a polyurethane latex is used. The polyurethane latex may be prepared according to a technology, which is amongst others disclosed in U.S. Pat. Nos. 4,046,729 and 4,066,591, both to PPG-Industries Inc., and in Netherlands U.S. Pat. Nos. 140,881 and 141,914 to Bayer AG.

The polyurethane polymer might be built up from an aliphatic, cycloaliphatic or an aromatic diisocyanate, a "polyol based on a polyester diol having a molecular weight of 500–5000, preferably 1000–2000, a polyether diol having a molecular weight of 400–6000, preferably 1000–2000, a polycarbonate diol having a molecular weight of 500–5000, preferably 1000–2000, whether or not with other types of polydiols and mixtures, or low molecular weight diols, such as: neopentyl glycol, 1,2-ethane diol, 1,3-butane diol, 1,4-butane diol and others and mixtures thereof and a diamine such as: 1,2-ethane diamine, 1,3-propane diamine, isophoronediamine, and others.

The coagulation is preferably carried out in an impregnating bath containing 5–30%, by weight, preferably 5–15%, by weight, of the polymer latex.

By using the coagulation according to the heat-coagulant process good results are obtained according to the invention when as heat-coagulant alkoxylated amines, preferably with a molecular weight of 800–6000, are used: organopolysiloxanes or derivatives thereof, polyvinyl alkylethers or derivatives thereof, polyacetals, polythio ethers, poly (ethylene oxide) or derivatives thereof, poly (propylene/ethylene oxide) or derivatives thereof.

In particular, when poly(ethylene oxide) is used as heat-coagulant, the heat-coagulable polyurethane latex may be obtained by the use of a polyurethane latex containing the poly(ethylene oxide) component in the polymer chain of the polyurethane polymer. In this connection a polyurethane latex is prepared according to a technology, which is amongst others disclosed in the above-mentioned U.S. Pat. Specifications.

The introduction of the poly(ethylene oxide) component is carried out according to a known process, wherein both OH groups of the poly(ethylene oxide) component are reacted in the polymer chain by means of the reaction with the NCO groups of the used diisocyanate.

According to the invention good results are obtained if as a starting material a poly(ethylene oxide) component is used having a molecular weight of 600–4000, preferably 1000–2000. Furthermore, mixtures of the poly(ethylene oxide) components having different molecular weights may be used.

According to the invention good results may be obtained if 0.5–10 mole % of the poly(ethylene oxide) diol component is introduced into the polyurethane polymer. Preferably, 1.5–5.0 mole % is built into the polyurethane polymer.

The composition also includes either a chemical or physical foaming agent.

If according to the invention a physical foaming agent is used, in that case a water insoluble solvent having a boiling point between $-40°$ C. and $+50°$ C., and preferably between $-20°$ C. and $+30°$ C., is used.

Good results are obtained according to the invention when use is made of a water insoluble solvent, such as halogenated saturated or unsaturated aliphatic, or aromatic hydrocarbons, whether or not encapsulated in a polymer film.

Representative foaming agents which may be utilized include trichlorofluoromethane, 1,2-dibromo-1,1,2,2-tetrafluoroethane and microspheres with a particle size varying between 5 and 25 microns containing low boiling water insoluble aliphatic and/or aromatic hydrocarbons. Preferred results are achieved when polyvinylidene chloride (PVdC) microspheres having a particle size of 5 to 10 microns containing isobutane is used as the foaming agent.

The amount of foaming agent is 10 weight %. However, the amount used is strongly dependent upon the type of application and, as such, can vary from 5 to 10 weight %.

The invention also provides a process for the preparation of a coagulated material by impregnating a textile cloth in an impregnating bath containing a coagulable polymer latex and a foaming agent, followed by coagulation in a coagulating bath, characterized in that the coagulation is carried out from the water phase, wherein foaming occurs simultaneously with the coagulation or immediately thereafter.

It is surprisingly found that according to the present process a high quality coagulated material is obtained, having properties comparable with the coagulated material, obtained according to conventional solvent-based processes.

The undesired film forming does not occur according to the invention, mainly due to the use of a chemical or physical foaming agent in an aqueous system, which foaming agent imparts to the coagulated polymer coating a foamed character during or immediately after the coagulation process under obtaining a desired coagulation structure.

The coagulation and/or foaming of the polymer latex occurs according to the invention by heating the impregnated textile cloth, preferably in the presence of a heat-coagulant.

Usually, the coagulation and/or foaming occurs in an aqueous coagulating bath at a temperature of at least 15° C., wherein until a temperature of about 70° C. usually only coagulation takes place, whereas at a temperature higher than about 70° C. both coagulation and foaming occur.

Preferably, the coagulation is carried out in an aqueous coagulating bath of 70°–100° C., wherein both coagulation and foaming take place.

Furthermore, the coagulation and foaming of the polymer latex may be carried out according to the invention in a steam chamber at 100°–130° C., and preferably at 100°–110° C.

Furthermore, the coagulation and foaming may be carried out in a quick heat transfer oven, for instance in a so-called microwave oven or in an infrared dryer.

Finally, the coagulation of the polymer latex according to the invention may be carried out successfully by means of a suitable electrolyte and/or a change in pH, which is adapted to the polymer latex used.

In addition to the heat coagulable latices described above those polymer latices which are dispersed in water by means of an essentially anionic or cationic emulsifying system, are useful in the compositions and processes of this invention.

In case of anionic polymer latices a quick coagulation occurs at a pH less than 7, whereas in case of cationic polymer latices the coagulation occurs preferably at a pH greater than 7.

Herein a temperature of 15°–75° C. is used.

The coagulated polymer latex thus obtained is subsequently foamed by heating in a warm water bath, steam bath or in a quick heat transfer oven, at the above-mentioned temperatures.

As disclosed above, the desired results according to the invention are obtained by the fact that the foaming of the coagulated polymer coating occurs simultaneously with the coagulation process or immediately thereafter.

In practice, the process according to the invention may usually be carried out in two ways.

According to the first way, a textile cloth is impregnated in an impregnating bath, containing a coagulable polymer latex and a heat-coagulant, or a polymer latex, wherein the heat-coagulant is built in the polymer chain, and a chemical or physical foaming agent, followed by coagulation, wherein the entire impregnation and coagulation process is carried out from the water phase, whereupon subsequently or during the coagulation process the foaming of the polymer latex, already coagulated on the textile cloth, occurs.

According to the other way, a textile cloth is impregnated in an impregnating bath containing at least one electrolyte instable polymer latex of highly anionic or highly cationic character and a chemical or physical foaming agent. Hereafter coagulation takes place at a pH less than 7, if an anionic polymer latex is used, or at a pH greater than 7, if there is used a cationic polymer latex, wherein, if desired, one or more electrolytes may be added. Coagulation may occur, too, by means of electrolytes only without pH adaption.

Immediately after the coagulation of the polymer latex on the textile cloth foaming occurs by heating to the proper temperature.

Both ways result in a high quality coagulated material.

The undesired film forming does not occur, which is mainly due to the use of a chemical or physical foaming agent, which renders the coagulated polymer coating during or immediately after the coagulation process, dependent on the chosen embodiment, a foaming character by immersing it in a hot water bath under obtaining a desired coagulation structure.

The desired coagulation structure also may be obtained by coagulating the impregnated textile cloth, if the process according to the invention is carried out according to the first way. directly in an instantaneous heat transfer oven, such as a microwave oven, IR-dryer or the like, wherein simultaneously a foaming structure is obtained.

The coagulation according to the invention according to the first way is carried out as follows:

An in water coagulable polymer latex composition is applied onto a textile cloth, woven or non-woven. This application may be effectuated by immersing it in an impregnating bath of a proper pH, preferably less than 7, with at least the proper components according to the invention.

The amount of polymer, which is applied during impregnation, depends on the impregnating techniques used, which are known to those skilled in the art, and on the absorption ability of the used textile cloth and it may furthermore be controlled by means of a foulard or a knife over roll. The amount of polymer to be applied is highly dependent on the use of the coagulated cloth thus obtained.

The in water coagulable polymer latex composition according to the invention may be applied by means of known coating techniques, such as amongst others reverse roll coating techniques, the screen printing techniques, a knife over roll, flow coat application techniques, spray application techniques, etc. Dependent on the use of the polymer latex the composition may be applied on the cloth on one side or on both sides.

The properties of the coagulated material, such as feel, colour, etc. may be modified by adding the usual additives to the polymer latex.

An additional advantage of the application of the process according to the invention is that materials which are not resistant against DMF may be used as substrates for coagulation. In the known procedure, DMF is used in the impregnating bath as solvent, which means that those materials to which DMF is too aggressive, may not be used as substrate for coagulation according to the known procedure.

As substrate for coagulation according to the invention the following materials may be used: wovens based on natural or synthetic fibers, such as polyester, polyamide and acryl fibers as well as blends thereof. The invention is also suited for non-woven substrates.

After application of the polymer latex composition according to the invention by means of one of the above-disclosed ways onto the textile cloth the coagulation is carried out by conveying the textile cloth thus obtained through a heated water bath, usually at a temperature of at least 50° C. and preferably at 85°-100° C., or in a steam chamber, usually at 100°-130° C., and preferably at 100°-110° C., wherein the coagulation process and the foaming process of the polymer latex coating essentially simultaneously occur.

According to the invention it is also possible to carry out the coagulation phase and the foaming phase separately, the one after the other.

By doing so, first the polymer latex composition is coagulated in a heated water bath with a temperature of preferably 50°-70° C., whereupon the foaming of the polymer latex film occurs by conveying the obtained coagulated cloth through a heated water bath, usually at a temperature of at least 85° C. and preferably at 90°-100° C., or in a steam chamber, usually at 100°-130° C., and preferably at 100°-110° C.

According to an embodiment of the process according to the invention the coagulation and foaming are carried out by means of an instantaneous heat transfer oven. Herein a textile cloth, which is provided with the polymer latex composition of the invention is directly placed in a microwave oven or a similar oven. Accordingly, coagulation, foaming and drying may take place simultaneously. The advantage of this embodiment is clear: a coagulating bath and foaming bath are superfluous.

The coagulation according to the other way of the invention is carried out as follows:

According to the above-described application technique there is applied on a textile cloth a polymer latex composition suitable according to the invention, which composition is electrolyte instable in water and which is a highly anionic polymer latex or a highly cationic polymer latex.

After applying a polymer latex composition according to the invention on a cloth by means of the above-described processes, the coagulation is carried out.

The thus treated textile cloth is conveyed through a water bath of 15°-75° C., but preferably at 40°-60° C. The bath is adjusted to a pH less than 7, if a highly anionic polymer latex is applied, or to a pH greater than 7 if a highly cationic polymer latex is used.

Furthermore, the coagulating bath contains, if required, one or more electrolytes. The pH-range and concentration and type of electrolyte are dependent on the type of polymer latex employed.

After having provided the textile cloth with a coagulated polymer latex composition, the coagulated coating is foamed by conveying the treated textile cloth through a hot water bath, whether or not at the same pH as the coagulating bath, usually at a temperature of at least 70° C. and preferably at 85°-100° C., or in a steam chamber, usually at 100°-130° C., and preferably at 100°-110° C.

The foaming may also be carried out by means of an intensive heat transfer oven, such as a microwave oven, IR drying oven, etc.

The advantage of this embodiment compared with the first-described embodiment is that coagulation may take place at room temperature and without making use of heat-coagulants.

However, the coagulation process and the foaming process do not take place simultaneously but the one after the other, so that the foaming requires an additional bath.

By use of the coagulation by means of the addition of electrolytes and/or adaption of the acidity of electrolyte instable polymer latex of highly anionic or highly cationic character, respectively, good results are obtained if it is started from the salts of the alkali and earth alkaline metals of hydrogen chloride, nitric acid, sulphuric acid or water soluble salts of aluminum, iron, manganese, cobalt, cadmium, chromium and others.

The adaption of the acidity of the coagulating bath and/or foaming bath may occur by adding suitable known acids and bases, respectively. The acidity, type and concentration of the electrolyte are highly dependent on the starting polymer latex and it may only be determined experimentally per polymer latex composition.

According to the invention the combination of both above-mentioned embodiments yields good results.

The favourable foaming, required for the achievement of the desired coagulation structure, occurs in the coagulating bath if it is desirable to have the coagulation and the foaming of the coagulated polymer latex coating taking place in one single phase. Good results are obtained by carrying out the foaming after the coagulation.

In this case the textile cloth, which is provided with a coagulated polymer latex, is conveyed in a second heated water bath. The temperature of this foaming bath is highly dependent on the used foaming agent and is at least 50° C., and preferably 70°–100° C. Foaming also may occur by conveying the coagulated cloth through a steam chamber, usually at 100°–130° C., and preferably at 100°–110° C.

Foaming may also occur by conveying the coagulated cloth through an instantaneous heat transfer oven, such as a microwave oven, infrared radiators, etc.

The invention comprises furthermore the coagulated material, obtained by the use of the present process. This coagulated material has very favourable characteristics and physical properties which are essentially similar with the coagulated material manufactured by the known processes.

The coagulated materials of the present invention have a thickness of at least 200 microns, a density of from 0.1 to 0.4 with an irregular open and closed pore cell structure with the diameter of the pores equal to from 20 to 50 microns.

The invention is now illustrated by means of the following examples.

EXAMPLE I

In an impregnating bath having the dimensions of 200×200×250 mm a polyethyl acrylate dispersion, known as RA-2, commercially available from Stahl Chemical Industries B. V. at Waalwijk, Netherlands, was introduced. This resin was then diluted with water to a solids contents in the impregnating bath of 20%, by weight.

Then 20%, by weight, based on the solids, of an alkoxylated amine, known as Cartafix U, commercially available from Sandoz A. G., Basel, Switzerland, is added to this resin.

Then the pH was adjusted to 4.7, whereupon while stirring 5% of 1,2-dibromo 1,1,2,2-tetrafluoroethane was added.

A textile cloth, which was made rough on both sides and having a weight of 180 g/m: and dimensions of 100×100 mm, was impregnated by immersion in the impregnating bath during 10 sec.

Subsequently, the impregnated cloth was squeezed by means of a knife over roll in such a way that the cloth contained 1200 g acrylate dispersion composition per m².

Hereafter the impregnated cloth was conveyed into a coagulating bath, having dimensions of 200×200×250 mm, containing water of 95° C. The residence time in the coagulating bath was 30 sec.

Finally, the water was removed from the obtained coagulated cloth by means of foulard and a drying oven at a temperature of 150° C.

The resulting substrate had the same appearance and absorption ability as a coagulated material, obtained by the conventional procedure.

EXAMPLE II

Analogous to Example I, provided that the polyethyl acrylate latex was replaced by a polychloroprene latex, known as Neoprene Latex from Dupont-U.S.A.

The obtained coagulated material had the appearance and the absorption ability which was comparable with the coagulated material obtained according to the conventional procedure.

EXAMPLE III

Analogous to Example II.

The polychloroprene latex was replaced by an acrylonitrile butadiene latex, known as No. 840, commercially available from Synthomer Chemie G.m.b.H., West Germany, whereas the 1,2-dibromo 1,1,2,2-tetrafluoroethane was replaced by trichloro fluoromethane. By doing so, a coagulated material is obtained with an excellent flexibility.

EXAMPLE IV

Analogous to the procedure of Example III.

The acrylonitrile butadiene latex was replaced by an anionic polyurethane latex, known as UE-9002, commercially available from Stahl Chemical Industries B.V., Waalwijk, Netherlands.

The obtained coagulated material had the appearance, the flexibility, the absorption ability and furthermore the physical characteristics of a coagulated material obtained according to the conventional procedure.

EXAMPLE V

Analogous to the procedure of Example IV.

The alkoxylated amine was replaced by polyvinyl methylether, wherein the ratio coagulant/latex was changed to 30%, by weight, of coagulant, based on the solids of the latex. This was necessary, because of the less effectiveness in coagulating properties compared with the formerly used alkoxylated amine.

A substrate was obtained having an absorption ability and physical characteristics similar to a coagulated material obtained according to the conventional procedure.

EXAMPLE VI

In an impregnating bath having the dimensions of 200×200×200 mm a polyurethane dispersion having the following composition, was introduced. A prepolymer was prepared according a process as disclosed in the U.S. Pat. Nos. 4,046,729 and 4,066,591, wherein 9 mole % of a poly (ethyleneoxide) diol having a molecular weight of 1000, was built into the prepolymer. As polyester diol a hexane diol adipate, having a molecular weight of 2000, is used in a mole % of 47. As diisocyanate the hexamethylene diisocyanate was used.

The formulation occurred such, that the NCO/OH ratio was 1.8. As extending agent isophorone diamine was used. Solids contents of the dispersion was 30%, by weight.

This resin was diluted with water to a solid contents in the impregnating bath of 12%, by weight.

Then the pH of the impregnating bath was adjusted to 4 by means of acetic acid. Subsequently, 5% trichloro fluoromethane was mixed in.

A cotton cloth, both sides of which were made rough, having a weight of 180 g/m: and dimensions of 100×100 mm, was impregnated by immersing it in the impregnating bath during 10 sec.

Then the impregnated cloth was squeezed by means of a knife over roll, in such a way that the cloth contained 1000 g polyurethane dispersion composition per m².

Then the impregnated cloth was conveyed in a coagulating bath of 200×200×250 mm, containing water of 80° C. The immersion time in the coagulating bath was 30 sec.

The excess of water was now removed by means of foulard 30 and a drying oven at a temperature of 150° C.

The resulting substrate had the same appearance, absorption ability, flexibility and physical characteristics as a coagulated material, obtained according to the conventional procedure.

EXAMPLE VII

In an impregnating bath of 200×200×250 mm an anionic polyurethane dispersion, known as UE-9002, commercially available from Stahl Chemical Industries B.V., Waalwijk, Netherlands, was introduced. This resin was diluted with water to a solid content in the impregnating bath of 12%, by weight. Then 5% 1,2-dibromo 1,1,2,2-tetrafluoroethane was mixed in.

A cotton cloth, both sides of which were made rough, and having a weight of 180 g /m:, dimensions 100×100 mm, was impregnated by immersing it in the impregnating bath during 10 sec.

Then the excess of polyurethane dispersion composition was squeezed by means of a knife over roll (to 1500 g/m$^2$).

Hereafter this impregnated cloth was conveyed into a coagulating bath of 200×200×250 mm, containing water of 20° C., whereas the pH of said bath was adjusted to 3 by means of acetic acid. The coagulation was carried out by immersion during 60 sec.

Then the cloth was conveyed into a water bath of 70° C. under obtaining a foam structure.

The excess of water in the cloth was removed by means of foulard and a drying oven.

The obtained cloth had similar appearance, absorption ability, flexibility and physical characteristics as a coagulated material manufactured according to the conventional procedure.

EXAMPLE VIII

Analogous to the process of Example VII provided that the coagulation and foaming took place simultaneously in the coagulating bath at a temperature of 80° C. and at a pH of 3.

The resulting substrate had excellent physical characteristics, flexibility and appearance, which were similar to a coagulated material obtained according to the conventional procedure.

EXAMPLE IX

Analogous to the process of Example VIII.

The acetic acid in the coagulating bath was replaced by 5%, by weight, of magnesium chloride, whereas the temperature of the foaming bath was 90° C. instead of 80° C.

The obtained coagulated material had the physical characteristics and the absorption ability similar to a coagulated material, obtained according to the conventional procedure.

EXAMPLE X

Analogous to the process of Example IX.

The polyurethane latex was replaced by a polyethyl acrylate dispersion, known as RA-2, commercially available from Stahl Chemical Industries B.V., Waalwijk, Netherlands.

The percentage of magnesium chloride could be reduced to 1%.

The obtained substrate had similar characteristics as disclosed under Example II.

EXAMPLE XI

Analogous to the process of Example IV.

The impregnated cloth was heated in a microwave oven during 5 minutes after the impregnating phase and the water removal.

Accordingly, a coagulated cloth was obtained having a foam structure with characteristics and appearance essentially similar with the coagulation structure of the preceding examples.

EXAMPLE XII

In an impregnating bath having the dimensions of 200×200×250 mm a polyethyl acrylate dispersion blend (80/20) of X4460 and 254290 both commercially available from National Starsh Industries, Bridgewater, N.J. is introduced. This resin is then diluted with water to a solids contents in the impregnating bath of 20%, by weight.

Then 20%, by weight, based on the solids, of an alkoxylated amine, known as Cartafix U, commercially available from Sandoz, Charlotte, N.C. is added to this resin. One percent by weight of an aziridine cross linker (CX100) from Polyvinyl Chemicals Inc., Wilmington, Mass. is then added.

Then the pH is adjusted to 4.7, with 7% acetic acid solution while stirring. Then 5% of 1,2-dibromo 1,1,2,2-tetrafluoroethane is added.

A textile cloth, which is made rough on both sides and having a weight of 180 g/m: and dimensions of 100×100 mm, is impregnated by immersion in the impregnating bath during 10 sec.

Subsequently, the impregnated cloth is squeezed by means of a knife over roll in such a way that the cloth contains 1200 g acrylate dispersion composition per m$^2$.

Hereafter the impregnated cloth is conveyed into a coagulating bath, having dimensions of 200×200×250 mm, containing water of 95° C. The residence time in the coagulating bath is 30 sec.

Finally, the water is removed from the obtained coagulated cloth by means of foulard and a drying oven at a temperature of 150° C.

The resulting substrate has the same appearance and absorption ability as a coagulated material, obtained by the conventional procedure.

EXAMPLE XIII

Analogous to the procedure of Example XII.

The Polyethyl acrylate dispersion is replaced by a nitrile rubber dispersion identified as GEON 1577 commercially available from B. F. Goodrich, Akron, Ohio.

We claim:

1. In a process for preparing a coagulated material comprising impregnating a textile cloth with at least a coagulable polymer latex and coagulating said polymer on the cloth, the improvement comprising carrying out the coagulation from the water phase and foaming the coagulated polymer with a foaming agent comprising microspheres having particle size of between 5 and 25 microns containing low boiling water insoluble aliphatic and/or aromatic hydrocarbons, said foaming occurring simultaneously with or immediately after the coagulation.

2. A process according to claim 1 wherein said microspheres comprise polyvinylidene chloride.

3. A process according to claim 2 wherein said microspheres have a particle size of 5 to 10 microns.

4. A process according to claim 1 wherein said hydrocarbon is isobutane.

5. A process according to claim 1 wherein the coagulation takes place in an aqueous coagulating bath.

6. A process according to claim 1 wherein the coagulation is carried out by means of a heat-coagulant.

7. A process according to claim 6 wherein the heat-coagulant is built into the polymer backbone.

8. A process according to claim 7 wherein 0.5–10 mole percent of poly(ethyleneoxide)diol is used as the heat-coagulant built into the backbone of a polyurethane latex polymer.

9. A process according to claim 1 wherein said polymer latex is selected from the group consisting of polybutadiene latex, polybutadiene styrene copolymer latex, polybutadiene acrylonitrile copolymer latex, polystyrene butadiene acrylonitrile terpolymer latex, polychloroprene latex, polyacrylate latex, polyvinyl acetate latex and polyurethane latex.

10. A process according to claim 8 wherein the heat-coagulant is selected from the group consisting of polyvinyl alkyl ether and derivatives thereof, polyacetals, polythio ethers, poly(ethylene oxide) and derivatives thereof, poly(propylene/ethylene oxide) and derivatives thereof.

11. A process according to claim 8 wherein said heat-coagulant comprises 2 to 30 percent by weight based upon the solid components of the polymer latex.

12. A process according to claim 1 wherein the impregnation of the textile cloth is carried out in an impregnating bath containing 5 to 30 percent by weight polymer latex.

13. A process according to claim 1 wherein the foaming step is carried out in an aqueous bath.

14. A process according to claim 13 wherein said coagulation and foaming are carried out simultaneously in the same aqueous bath at a temperature of 70°–100° C.

15. A process according to claim 12 wherein the foaming is carried out in a steam chamber at 100°–130° C.

16. A process according to claim 12 wherein the foaming is carried out in a quick heat transfer oven.

17. A process according to claim 1 wherein the coagulation is carried out in an aqueous bath containing an electrolyte in which the polymer latex is unstable.

18. A process according to claim 17 wherein the latex is an anionic polymer latex and the coagulation takes place at a pH less than 7.

19. A process according to claim 17 wherein the latex is a cationic polymer and the coagulation takes place at a pH greater than 7.

20. A composition comprising
 (a) a coagulable polymer latex, and
 (b) a foaming agent comprising microspheres having a particle size of between 5 and 25 microns containing low boiling water insoluble aliphatic and/or aromatic hydrocarbons.

21. A composition according to claim 20 wherein said microspheres comprise polyvinylidene chloride.

22. A composition according to claim 21 wherein said microspheres have a particle size of 5 to 10 microns.

23. A process according to claim 20 wherein said hydrocarbon has a boiling point between −40° C. and +50° C.

24. A composition according to claim 20 wherein said hydrocarbon is isobutane.

25. A composition according to claim 20 wherein said polymer latex is a polyurethane.

26. A composition according to claim 20, further comprising (c) a heat coagulant.

27. A composition according to claim 26 wherein said heat-coagulant is built into the backbone of the coagulable polymer.

* * * * *